United States Patent [19]

Fukui et al.

[11] Patent Number: 4,630,849
[45] Date of Patent: Dec. 23, 1986

[54] OIL WELL PIPE JOINT

[75] Inventors: Kunihiro Fukui, Kawanishi; Minoru Nishihara, Kyoto; Toshiro Mase, Ashiya; Yoshiyasu Morita, Nara; Hisakazu Kawashima, Kobe, all of Japan

[73] Assignee: Sumitomo Metal Industries, Ltd., Osaka, Japan

[21] Appl. No.: 716,765

[22] Filed: Mar. 27, 1985

[30] Foreign Application Priority Data

Mar. 29, 1984 [JP] Japan ................................. 59-62629

[51] Int. Cl.⁴ ............................................. F16L 9/14
[52] U.S. Cl. ........................................ 285/55; 285/94; 285/333; 285/422
[58] Field of Search ................... 285/55, 94, 333, 334, 285/355, 390, 422; 427/376.8, 386, 388.1, 436, 437

[56] References Cited

U.S. PATENT DOCUMENTS

| | | | |
|---|---|---|---|
| 1,141,151 | 6/1915 | Speller | 285/333 |
| 3,627,561 | 12/1971 | Richards | 427/376.8 |
| 3,716,348 | 2/1973 | Perkins | 427/437 |
| 3,869,393 | 3/1975 | Booker | 285/94 |
| 4,049,861 | 9/1977 | Nozari | 427/386 |
| 4,113,914 | 9/1978 | Doss | 427/386 |
| 4,384,737 | 5/1983 | Reusser | 285/334 |
| 4,474,651 | 10/1984 | Yauchi et al. | 204/41 |
| 4,506,432 | 3/1985 | Smith | 285/334 |
| 4,511,606 | 4/1985 | Ehrlich et al. | 427/386 |
| 4,527,815 | 7/1985 | Frick | 285/55 |
| 4,538,840 | 9/1985 | DeLange | 285/333 |

FOREIGN PATENT DOCUMENTS

| | | | |
|---|---|---|---|
| 97588 | 7/1980 | Japan | 285/355 |
| 2068776 | 8/1981 | United Kingdom | 427/386 |
| 2140117 | 11/1984 | United Kingdom | 285/94 |

Primary Examiner—
Assistant Examiner—Anthony Knight
Attorney, Agent, or Firm—Burns, Doane, Swecker & Mathis

[57] ABSTRACT

An oil well pipe joint comprising a metal-to-metal sealing portion without thread is disclosed. A metal-plated or resin-coated layer exhibiting improved resistance to galling is provided on the outer peripheral surface of a thread-free lip portion which constitutes part of the metal-to-metal sealing portion on an externally-threaded member. At the metal sealing portion, satisfactory sealing properties are maintained under severe corrosive conditions, enabling the joint to be connected and disconnected over 10 times, and usually over 25 times.

10 Claims, 6 Drawing Figures

OIL WELL PIPE JOINT

BACKGROUND OF THE INVENTION

This invention relates to an oil well pipe joint for use in connecting oil well casing and tubing which are forced deep into the ground in the production of natural gas as well as crude oil.

In recent years, the depths of oil wells have increased to upwards of several thousand meters, sometimes reaching 10,000 meters below the ground.

The number of oil well casing and tubing members required to make up one oil well is accordingly also increasing. A large number of these pipes are connected in series by screw-type pipe joints.

Due to the great depths and lengths of piping, such pipe joints are exposed to severe conditions in which tensile load is applied in the axial direction due to the combined weight of the casing or tubing and joints therefor. In addition, compressive load due to soil pressure, etc. is also applied to the peripheral surface of each joint. Also, expansion load due to the pressure of the fluid passing through the joint is applied to the inner surface of the joint. These forces increase as the depth of the oil well increases. Nowadays, it is not unusual to exploit crude oil and natural gas under corrosive conditions containing $H_2S$ and $CO_2$ at a high pressure. Thus, pipe joints for use in connecting oil well pipes have to resist such severe corrosive conditions, too.

Therefore, it is very important that even under these severe conditions pipe joints be able to resist high tensile stresses and resist corrosion so as to reliably seal against not only liquids but also gases.

In addition, since connecting and disconnecting are carried out repeatedly, pipe joints should also have satisfactory sealing properties after repeated connecting and disconnecting.

There have been proposed a variety of measures to meet these requirements. For example, Japanese Laid-Open Patent Application No. 56-109975 discloses, as shown in FIG. 1, an oil well pipe of the coupling type which comprises as part of the oil well pipe an edge portion 2 and a shoulder portion 3 on which soft metals or alloys 4, 5 are respectively deposited by means of a metallizing method. In addition, the angle "$\theta$" between the end surface of the edge portion 2 of the pipe 1 and a shoulder portion 9 of the coupling 6 is adjusted to be within 15 degrees. The connection of the pipe 1 with the coupling 6 is carried out by screwing an external thread 7 of the pipe 1 into an internal thread 8 of the coupling 6. In the screwed position, the edge portion 2 of the pipe 1 and the shoulder portion 9 of the coupling 6 cause the soft metal layer 4 to flow into a clearance provided between the edge portion and the shoulder portion, resulting in packing of the soft metal 4 within the clearance to provide sealing therebetween. Furthermore, between the shoulder 3 of the pipe 1 and the edge portion 10 of the coupling 6, the soft metal layer 5 flows into a clearance therebetween to fill it and establish sealing therein.

According to the disclosure of that invention, the sealing of pipe joints is ensured by the above structure. However, a lip portion which constitutes a metal sealing portion is not provided, and the occurrence of galling, which sometimes takes place upon connecting the pipe 1 with the coupling 6, is not taken into consideration. The soft metal layers 4, 5 easily wear out during connecting due to frictional heat, causing galling and a loss in sealing properties. Namely, the seal between the pipe 1 and the coupling 6 is mainly achieved by the contact of the edge portion 2 and shoulder 3 of the pipe 1, respectively, with the shoulder 9 and edge portion 10 of the coupling 6.

Thus, the seal between the external thread 7 and the internal thread 8 is not so reliable as expected. Once the seal between these edges and shoulders is lost due to galling during connecting or disconnecting, the reliability of the sealing properties of the pipes as a whole will be easily lost, sometimes resulting in oil or gas leakage. In addition, it is impossible to use the pipe 1 more than ten times, since there is no means provided to overcome the galling problem in this type of pipe joint.

In contrast, in the pipe joint disclosed in Japanese Laid-Open Utility Model Application No. 57-122884, as shown in FIG. 2, the sealing as well as the corrosion resistance thereof are ensured by the provision of a layer of a heat-, pressure-, and abrasion-resistant resin, such as a fluoroplastic, on threaded portions 13 and 13′ either of pipes 11, 11′, or coupling 12, or butt portions 14 of the pipes 11 and 11′, the pipes 11, 11′ and the coupling 12 constituting part of an oil well pipe. However, the pipe joint of this type does not have a lip portion, either, which constitutes a metal sealing portion, and the design does not take into consideration the occurrence of galling during connecting and disconnecting. Thus, when galling takes place, the resin layer wears away and the sealing properties will be lost easily.

U.S. Pat. No. 4,474,651 discloses an oil well pipe joint comprising a metal sealing portion provided with a metal plating layer. In that invention, the metal plating is applied not only to the metal sealing portion, but also to the threaded portions. Furthermore, both an externally-threaded member and an internally-threaded member are provided with the metal plating. That U.S. patent states that such structure is preferable.

SUMMARY OF THE INVENTION

A primary object of the present invention is to provide an oil well pipe joint which is free from the above-described disadvantages of prior art oil well pipe joints.

Another object of the present invention is to provide an oil well pipe joint which is free from galling even after repeated connecting and disconnecting of the pipe under the above-described severe corrosive conditions.

The inventors of the present invention noted that the occurrence of galling on a thread-free lip portion which constitutes a metal-to-metal sealing portion (sometimes referred to merely as "metal sealing portion") and is provided on an externally-threaded member (i.e. male thread member) of the oil well pipe joint is extremely rare in comparison with galling on the thread-free portion provided on an internally-threaded member (i.e. female thread member) which also constitutes a metal sealing portion of the oil well pipe joint. Based on this observation, the present inventors achieved the present invention.

The present invention resides in an oil well pipe joint comprising a metal-to-metal sealing portion which has no threads, characterized in that a metal-plated or resin-coated layer exhibiting improved resistance to galling is provided on the outer peripheral surface of a thread-free lip portion which constitutes part of the metal-to-metal sealing portion on an externally-threaded member.

Furthermore, the present invention resides in an oil well pipe joint having a metal-to-metal sealing portion, which comprises:

an externally-threaded member at the outer end of which a lip portion having a cylindrical periphery without threads is provided; and an internally-threaded member at the inner end of which a cylindrical inner surface corresponding to the cylindrical periphery free from threads is provided;

characterized in that a metal-plated or resin-coated layer exhibiting improved resistance to galling is provided at least on the thread-free lip portion of the externally-threaded member alone.

In the present description, the "metal-to-metal sealing portion" or "metal sealing portion" of a pipe joint means a contacting area between an externally-threaded member and an internally-threaded member in an area without threads, excluding areas of not only the thread portions but also the shoulder portion 3 of FIG. 1, the butt portion 14 of FIG. 2 and the like, since these pipe joints do not have a cylindrical periphery without threads. Namely, the metal sealing portion includes at least a thread-free lip portion provided at an end of the pipe joint and preferably it also includes a thread-free bottom portion provided near the rear end of the threaded portion on an externally-threaded member.

In addition, according to the present invention such a galling resistant layer is not provided on a thread portion nor on the opposing internally-threaded member.

An example of the galling resistant layer is a metal-plated layer of Cu, Sn, Zn, Pb, or alloys thereof. If a Cu-plated layer is used, the thickness is preferably 0.5-30 $\mu m$.

According to one aspect of the present invention, a metal plated, galling-resistant layer is prepared by applying composite plating to provide a metal matrix layer 0.5-50 $\mu m$ thick in which solid lubricating particles having a grain size of 0.1-50 $\mu m$ are dispersed throughout the metal layer matrix. Metals which may be used as the matrix include Zn, Cu, Sn, Pb, and alloys thereof. Materials which can be used for the solid lubricating particles are graphite fluoride, molybdenum disulfide, silicon fluoride, boron nitride, tetrafluoroethylene, and the like.

According to another aspect, the metal plating layer comprises an uppermost coating of chromium, molybdenum, tungsten, or alloys thereof and an undercoating of a soft metal such as Cu, Zn, Sn, Pb, and the like. The total thickness of the layer is 3-50 $\mu m$ with the thickness of the uppermost coating being at most one-half of the total thickness and the undercoating being 2 $\mu m$ or thicker.

According to still another aspect, the metal-plated layer is comprised of gold, platinum group metals, or alloys thereof.

As already mentioned, in place of the metal-plated layer, a resin-coated layer may be placed on the thread-free lip portion of the externally-threaded member.

In this respect, according to one aspect of the present invention, the surface to be resin-coated is prepared with a surface roughness of 5-25 $\mu m$ Rmax, and is coated with a synthetic resin in which fluoroplastic particles of 1 $\mu m$ or less in diameter are dispersed in an amount of 15-40% by weight. The thickness of the synthetic resin layer is restricted to be thinner than the maximum surface roughness. Synthetic resins which can be utilized include silicone resins (molecular weight of about 2,000), low molecular weight epoxy resins (molecular weight of about 20,000), polyether sulfones, epoxyphenol resins (molecular weight of 1,000-3,000), acrylic resins (molecular weight of 2,000-5,000), resorcinol epoxy resins (molecular weight of 20,000-50,000), polyamide resins (Nylon 66), polyoxybenzoyls available commercially under the trademark (Econol), and the like.

In a still another aspect, in place of the fluoroplastic particles, molybdenum disulfide ($MoS_2$) particles having particle diameters of 10 $\mu m$ or less may be used in an amount of 20-90% by weight.

Thus, according to the present invention, the above-described metal-plated or resin-coated layer is applied to the outer surface of at least the thread-free lip portion on the externally-threaded member so that the abrasion loss of the metal or resin is suppressed to a minimum. Therefore, satisfactory sealing properties are maintained at the metal sealing portion, enabling the joint to be connected and disconnected over 10 times.

BRIEF DESCRIPTION OF THE DRAWINGS

FIG. 4 is a schematic view illustrating the mechanism of the present invention;

DETAILED DESCRIPTION OF THE PREFERRED EMBODIMENTS

The present invention will now be described in conjunction with the accompanying drawings and some working examples, which are presented merely for illustrative purposes and do not restrict in any way the present invention.

Figure 1:
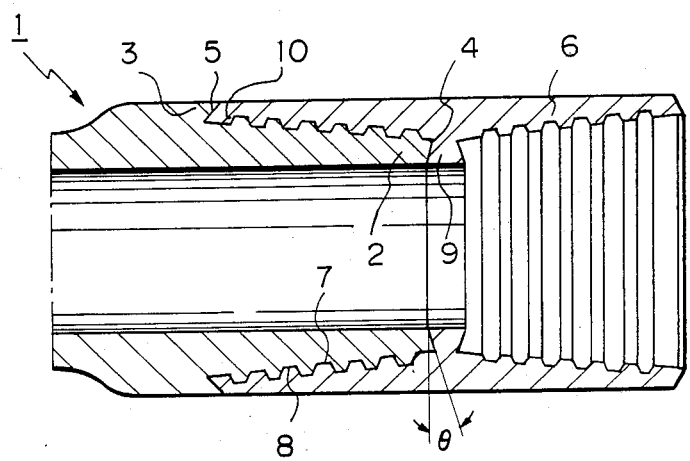
FIGS. 1 and 2 are views schematically explaining the structure of two prior art oil well pipe joints of the coupling type.
Figure 2:
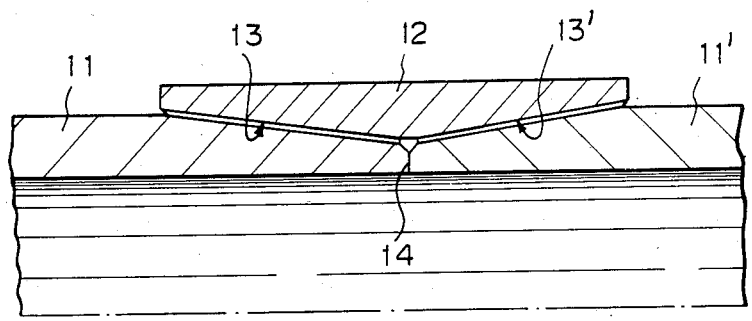
Figure 3A:
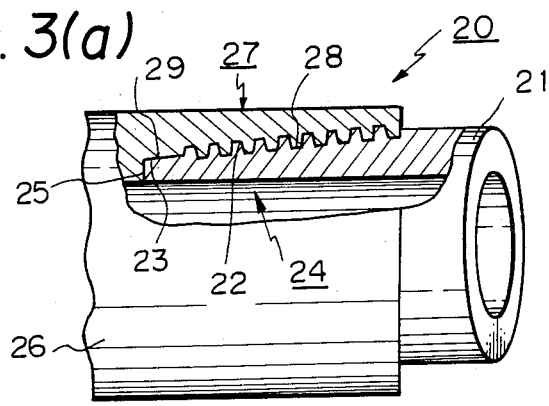
FIG. 3(a) is a schematic view partially in cross section showing the structure of the pipe joint of the present invention of the coupling type.
Figure 3B:
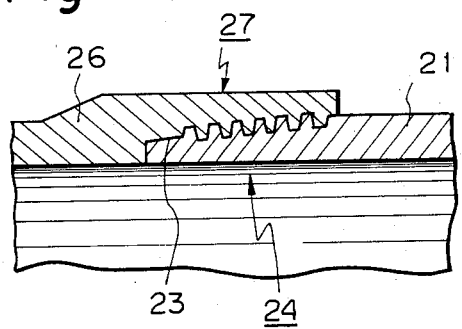
FIGS. 3(b), 3(c) and 4 3(d) are schematic, sectional views illustrating the structure of an integral type pipe joint of the present invention.
Figure 3C:
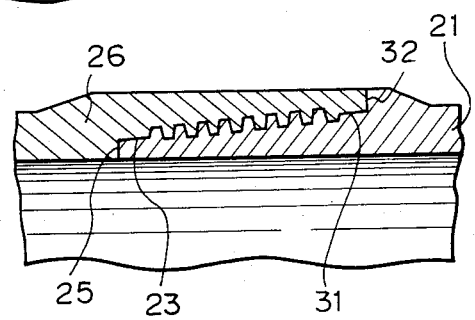
Figure 3D:
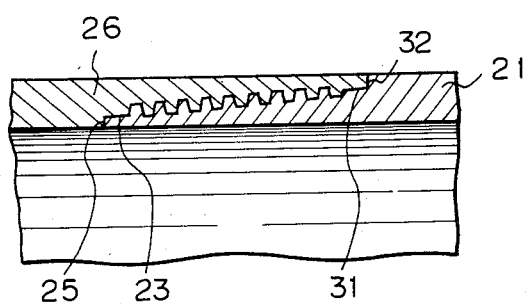

The pipe joint of the present invention covers a pipe joint of the coupling type shown in FIG. 3(a) and that of the integral type shown in FIGS. 3(b), 3(c), and 3(d). A lip portion which constitutes a metal sealing portion on an externally-threaded member is provided. When the metal sealing portions are provided at both the lip portion side and the bottom portion side of the externally-threaded member, according to the present invention, a metal-plated or resin-coated layer may also be provided on a lip portion of at least the outer end, i.e., the lip portion side of the externally-threaded member. Needless to say, this means that the layer may be provided on both the metal sealing portions at the lip portion side and the bottom portion side of the externally-threaded member. But, as already mentioned, the galling resistant layer is not provided on the internally-threaded member.

FIG. 3(a) shows a pipe joint of the coupling type 20 of the present invention partially in cross section. A pipe 21 is provided with an external thread 22, and a lip portion 23 is also provided at the lip portion side of the externally-threaded member 24. The tip of the lip portion 23 is an edge face 25 of the pipe 21. Another pipe 26 constituting an internally-threaded member 27 is provided with an internal thread 28, and a thread-free inner surface 29 is provided at the bottom portion side of the internally-threaded member 27. The thread-free inner surface 29 corresponds to the outer surface of the lip portion 23. The edge of the inner surface 29 is a shoulder portion corresponding to the edge face 25 of the lip portion 23. The thread-free outer peripheral surface 23 and the thread-free inner surface 29 are tapered. The contacting area of the outer peripheral surface 23 of the lip portion with the thread-free inner surface 29 and the contacting area of the edge face 25 with the shoulder portion constitute metal sealing portions. The former contacting area constitutes a main sealing portion and the latter constitutes a sub-sealing portion. Both of the sealing portions are referred to as the metal sealing portion in this specification.

FIGS. 3(b) through 3(d) show an integral-type pipe joint of the present invention. FIG. 3(b) shows a pipe joint similar to that of FIG. 3(a) having a thread-free outer surface 23, although the pipe joint shown in FIG. 3(b) is of the integral type. FIG. 3(c) shows another case, in which two thread-free outer peripheral surfaces 23 and 31 at the outer and inner ends, i.e., at a metal sealing lip portion and a metal sealing bottom portion are provided. The metal sealing bottom portion 31 terminates at a shoulder portion 32. FIG. 3(d) shows a case similar to that of FIG. 3(c) except that the wall thickness of the pipe joint portion is substantially the same throughout its length. Preferably, the galling-resistant layer is provided not only on the lip portion 23 and the root portion 31 but also on the edge face 25 and the shoulder portion 32 of the externally-threaded member.

Figure 4:
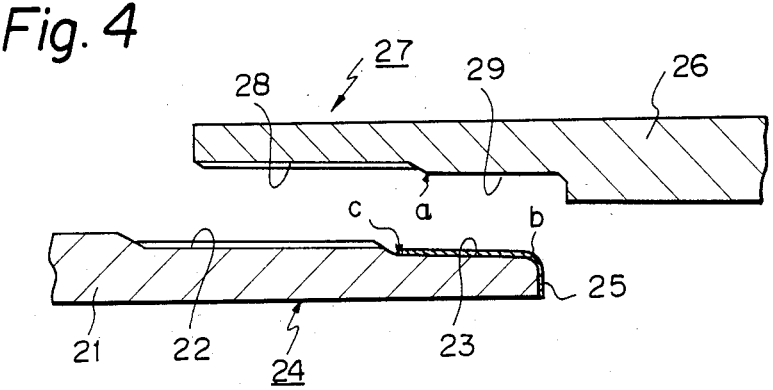

The mechanism by which galling takes place will be explained with reference to FIG. 4. The same reference numerals refer to the same members as in FIGS. 3(a)-3(d).

When connecting one pipe 21 with another pipe 26, i.e., connecting an externally-threaded member 24 with an internally-threaded member 27, the thread-free inner surface 29 of pipe 26 first contacts the outer peripheral surface 23 of pipe 21 at point "b", and last at point "c", where the opposite end of the outer peripheral surface 23 of the lip portion is located and where a maximum contacting surface pressure is generated.

Thus, point "a" of pipe 26 is in sliding contact with the outer surface 23 of the lip portion throughout the length thereof. Therefore, galling takes place most severely at areas near point "a". A metal-plated or resin-coated layer, if provided, would be easily removed from the thread-free inner surface 29 of the pipe 26, i.e., internally-threaded member 27, resulting in galling. This will result in a reduction in gas sealing ability as a whole.

Thus, according to the present invention the outer surface 23 of at least the lip portion of pipe 21 only, namely only externally-threaded member 24, is provided with a metal-plated layer exhibiting improved resistance to abrasion or a resin-coated layer exhibiting improved heat and abrasion resistance.

The reason why at least the lip portion outer surface 23 of only pipe 21 is provided with a metal-plated or resin-coated layer is that the outer peripheral surface 23 is less influenced by galling and can maintain thorough sealing properties. Namely, point "c" of the outer surface 23, where the highest contacting pressure is generated, contacts only point "a" of the pipe 26, and point "c" contacts a limited area of the thread-free inner surface 29 of the internally-threaded member 27. In addition, each point on the outer surface 23 of the lip portion which contacts point "a" of the pipe 26 progresses in a spiral form and contacts a new surface at every point. They temporarily contact point "a" where generation of frictional heat occurs most severely, rarely producing galling. However, even if galling took place, it would be distributed over the surface rather than localized and accordingly its effects would be slight.

Therefore, the amount of abrasion of the metal-plated layer or resin-coated layer is very small, and there is no galling whatsoever after one cycle of connecting and disconnecting. The above layer is substantially free from galling after ten cycles of repeated connecting and disconnecting.

Thus, according to the present invention, it is possible to substantially prevent galling during connecting, since a metal plating or resin coating layer is provided on the outer surface 23 of at least the lip portion of the externally-threaded member 24. As was explained above, it has been found that the outer surface 23 is the area least subject to galling. It is to be noted that essentially it is only the externally-threaded member on which the metal-plated or resin-coated layer is provided, and that at least the outer surface 23 of the lip portion should be provided with the above abrasion-resistant layer. Such a galling resistant layer may of course be provided on the edge face 25 as well as on the outer peripheral surface 23. Thus, it is possible to maintain thorough sealing properties at a metal sealing portion comprised of the thread-free, inner surface 29 of the internally-threaded member 27 and the thread-free, outer surface 23 of the lip portion of the externally-threaded member 24.

Although the description of the mechanism by which the present invention functions has been described with reference to an oil well pipe joint of the integral type, the same also applies to a joint of the coupling type.

Next, a process by which the outer surface 23 of the lip portion of a pipe 21 is covered with a metal-plated or resin-coated layer will be explained in conjunction with FIGS. 5 and 6.

Figure 5:
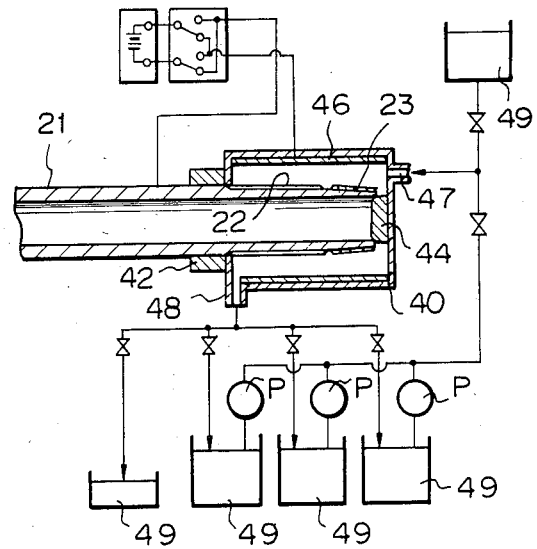
FIGS. 5 and 6 are schematic views explaining the formation of a metal-plated layer or resin-coated layer of the present invention.

FIG. 5 shows the case in which a cap cell 40 is placed surrounding the outer surface 23 of a lip portion and the external thread 22 to carry out metal plating. The cap cell 40 has a hollow sealing sleeve 42 at its open end. A projection 44 is provided on an inner wall of the cap cell 40 in order to prevent a plating solution from flowing into the inner side the pipe. Reference numeral 46 indicates an annular electrode, 47 an inlet for a plating solution, 48 an outlet, 49 a tank, and "P" indicates a pump. The process of carrying out the plating is the same as usual electroplating, and therefore a detailed description will be omitted.

Using a process employing the equipment illustrated in FIG. 5, it is possible to carry out metal plating of a long pipe 21 which is horizontally disposed without need for a large-sized treating apparatus. An area which is not desired to be metal plated, e. g., an external thread 22 is preferably covered beforehand with some material which is inert to the metal plating.

In general, material for producing an oil well pipe are low alloy steels, Cr-Mo steels containing a few per cent of chromium and molybdenum or the like. However, under severe corrosive conditions such as those mentioned before, a high chromium steel containing 10% or more of Cr, and preferably a high alloy steel containing $10\% \leqq Cr+Ni+Mo \leqq 95\%$ is used. When such a high Cr steel, is used as raw material for making oil well pipe, an activating layer is preferably provided on the outer surface by means of placing the outer surface in an aqueous acid solution containing chloride ions, then subjecting the surface to an anodic electrolytic treatment, then switching to a cathodic electrolytic treatment to deposit a metal selected from the group consisting of iron, nickel, zinc, cobalt, copper, manganese and chromium, and alloys thereof. Onto the thus-electroplated activating layer, the metal plating of the type briefly aforementioned and detailed hereinafter may be applied.

In addition, when a composite metal plating is applied, although it is applicable through either electrical plating or non-electrical plating, the solid lubricating particles are preferably added in an amount of 5–40% by volume.

In case chromium, molybdenum, tungsten, or an alloy thereof is placed on the thread-free lip portion according to the present invention, the undercoating of a soft metal is preferably of copper, zinc, tin, or lead, and the total thickness of the metal-plated layer is preferably 15–40 $\mu$m. When the thickness of the uppermost coating is over one-half the total thickness, the resulting layer becomes so hard that plastic deformation and energy absorption caused thereby is insufficient. If necessary, an additional metal-plated layer, such as the above-mentioned activating layer, an intermediate plated layer, or the like may be applied.

Thus, according to this embodiment of the present invention, the deformation stress applied to the uppermost coating is absorbed by the underlying soft metal layer. Peeling off of the uppermost coating is successfully prevented. If the uppermost coating breaks while connnecting the oil well pipe joint, the broken pieces of the coating do not peel off, but are imbedded in the underlying coating.

As mentioned before, it is desirable to provide a metal-plated layer of a metal selected from the group consisting of gold, platinum group metals, and alloys thereof, since these metal layers are superior with respect to not only resistance to galling but also resistance to corrosion under severe corrosive conditions. In the case where such a precious metal layer is provided, a sublayer of a metal selected from the group consisting of Cu, Sn, Pb, and alloys thereof may preferably be provided so as to improve the resistance to galling.

Figure 6:
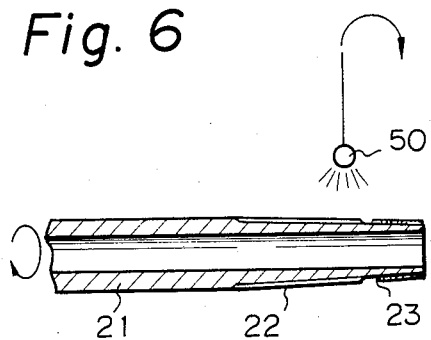

FIG. 6 shows the process for applying a resin-coated layer onto the outer surface of the lip portion.

As shown in FIG. 6, while the pipe 21 is rotated, a resin solution is sprayed through a nozzle 50 onto the outer surface 23 of the lip portion of the pipe 21. An external thread 22 is previously covered with some material which is inert to spray coating so that the resin is not placed on the external thread. After coating, the layer may be dried in an oven (not shown). In this case the pipe 21 may be kept in the horizontal position while it is treated.

In general, a resin coating is dielectric, so it does not constitute a local cell even when it contacts a metal. Therefore, the coating layer does not cause an acceleration in the corrosion of the substrate. In addition, since the resin is a polymeric substance, it does not decompose or degrade. Thus, a resin-coated layer which can exhibit improved resistance to corrosion and galling under severe corrosive conditions which are frequently experienced in deep oil wells is preferably applied as follows:

(i) The particle size of the fluoride resin to be added to a film-forming resin is 1 $\mu$m or less. In case molybdenum disulfide ($MoS_2$) particles are added, the diameter thereof is 10 $\mu$m or less.

(ii) The film-forming resin contains 15–40% by weight of the fluoride resin powder. In case molybdenum disulfide particles are added, the amount of the particles is 20–90% by weight.

(iii) The surface roughness of the metal sealing portion to be surface treated according to the present invention is 5–25 $\mu$m Rmax; and (iv) The thickness of the resin layer is 5–25 $\mu$m and it is thinner than the surface roughness of the substrate.

The reasons for the numerical limitations shown above will be explained with reference to the results of an abrasion test called the "Bauden" abrasion test.

The abrasion test was carried out as follows:
Pin-type test piece:
  Shape at the tip: Hemisphere 3/16 inch in diameter
  Surface roughness : 0.5 $\mu$m $R_{max}$
Plate-type test piece:
  Dimensions: 3×15×100 mm
  Surface roughness : 2–35 $\mu$m $R_{max}$
Sliding abrasion conditions:
  Holding pressure : 3 kgf
  Sliding distance : 10 mm
  Sliding rate : 4 mm/sec
  Temperature : 200° C.
  Lubricant : Thread compound 10 g/m$^2$ The pin-type test piece and the plate-type test piece were rubbed together and the number of slides before galling occurred was determined. The amount of particles which were worn away before galling occurred was also determined.

A series of these abrasion tests were carried out using various types of resin-coated layers provided at the tip of the pin-type test piece.

The surface of the plate-type test piece was sandblasted or shot-blasted and was free from such a resin coating. The surface roughness was 15 $\mu$m $R_{max}$, and the thickness of the coating was 10 $\mu$m.

The test results are graphed in FIGS. 7–13. The resistance to galling was determined by the number of slides, i.e., the number of repetitions before galling occurred.

Figure 7:
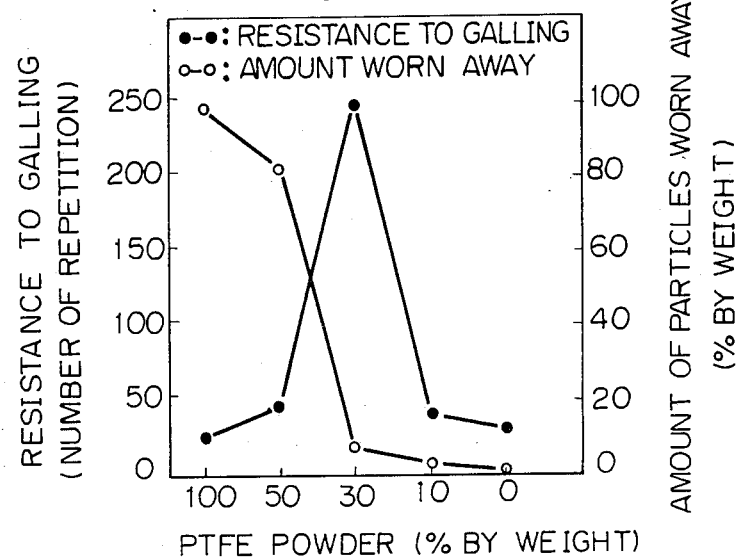
FIGS. 7 through 13 are graphs showing results of galling resistance tests.

FIG. 7 shows the case where the resin-coated layer was a lower polymeric epoxy resin (low molecular weight epoxy resin, molecular weight approx. 20,000) layer containing 0–50% by weight of polytetrafluoroethylene ("PTFE" hereunder) particles (0.5 $\mu$m in diameter). As is apparent from FIG. 7, a resin-coated layer containing 15–40% by weight, and preferably 20–35% by weight is advantageous.

Figure 8:
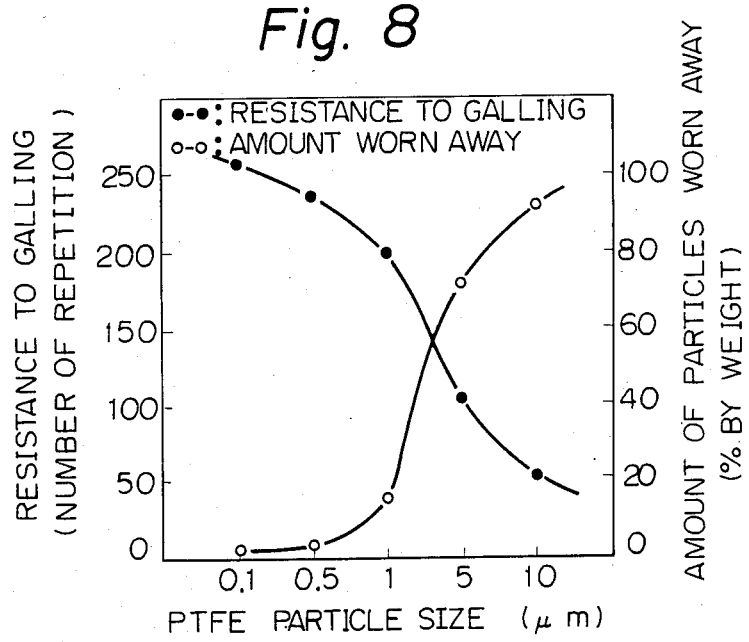

FIG. 8 is a graph showing galling resistance plotted against the particle size of the polytetrafluoroethylene particles for the case in which the coating resin was a low molecular weight epoxy resin and the amount of the particle incorporated was 30% by weight. As is apparent from the graph, the particle diameter is preferably 1 $\mu$m or smaller.

Figure 9:
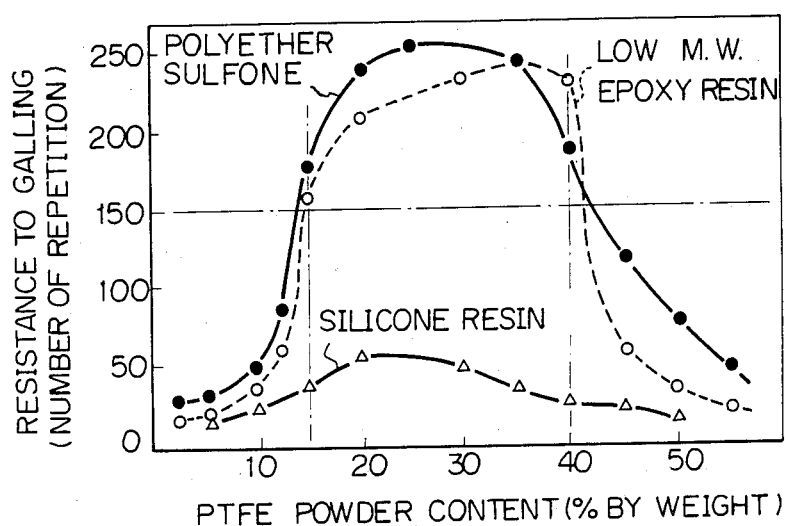

FIG. 9 is a graph similar to FIG. 7, in which various resins were used as a coating layer in which various amounts of polytetrafluoroethylene particles were incorporated. The matrix resin was a silicone resin (m.w. approx. 2,000), a low m. w. epoxy resin (m.w. approx. 20,000), and polyethylene sulfone.

Figure 10:
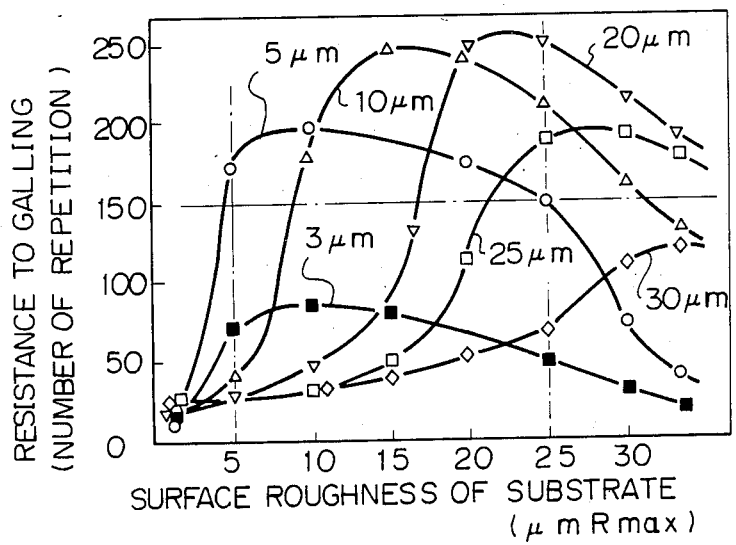

FIG. 10 is a graph of the test results plotted against the surface roughness of a pin-type test piece ranging from 2 $\mu$m $R_{max}$ to 35 $\mu$m $R_{max}$. The thickness of the resin-coated layer of said low m. w. epoxy resin was 3 $\mu$m, 5 $\mu$m, 10 $\mu$m, 20 $\mu$m, 25 $\mu$m, and 30 $\mu$m. The particle incorporated was PTFE 0.5 $\mu$m in diameter in an amount of 30% by weight.

The surface roughness is preferably 5–25 $\mu$m $R_{max}$. It is to be noted that the resistance to galling is noticeable when the surface roughness is larger than the thickness of the coating layer, i.e., when the thickness is smaller than the surface roughness. This means that the thickness of the coating resin is closely related to surface roughness of the coating resin layer, and that the surface of the coating resin layer should be so thin that the roughness thereof can reflect from the surface roughness of the substrate to some extent. Thus, the remaining roughness on the resin-coated layer surface may maintain a thread compound in recesses on the uneven surface during connecting and disconnecting in practice, resulting in good lubricating properties.

Figure 11:
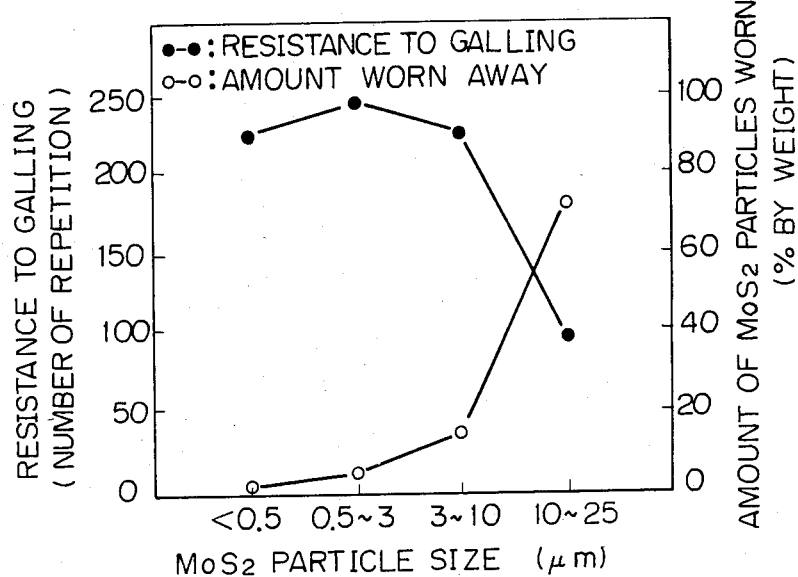

In FIG. 11, test results are plotted against the MoS$_2$ particle size. MoS$_2$ particles in an amount of 70% by weight were incorporated in a low molecular weight epoxy resin (m.w. approx. 20,000). It is apparent from FIG. 11 that the resistance to galling is markedly deteriorated and the amount of particles which are worn way increases when the particle size increases over 10 $\mu$m. The particle diameter of MoS$_2$ is 10 $\mu$m or less, preferably 3–10 $\mu$m.

Figure 12:
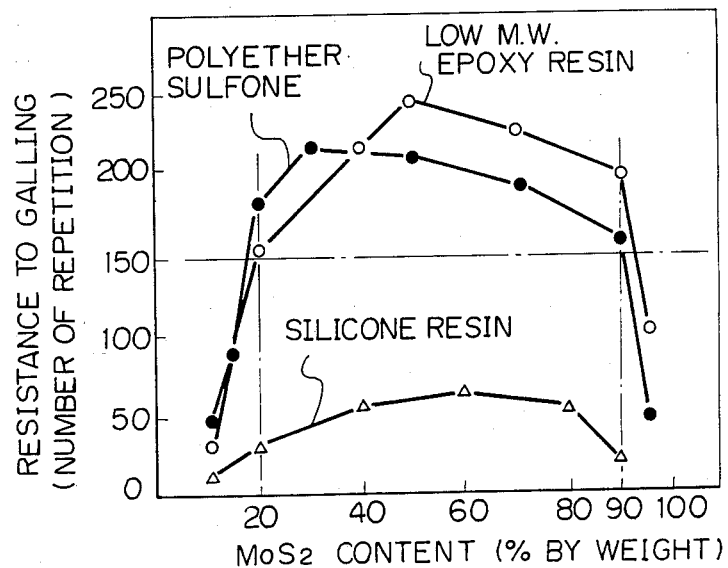

FIG. 12 is a graph showing the relationship between the resistance to galling and the content of MoS$_2$ particles in a resin coating layer. The resins employed were the same as in FIG. 9. The particle size of the MoS$_2$ particle was 6 $\mu$m on the average, ranging from 3 $\mu$m to 10 $\mu$m.

The content of MoS$_2$ is preferably 20–90% by weight, and more preferably it is 40–70% by weight.

Figure 13:
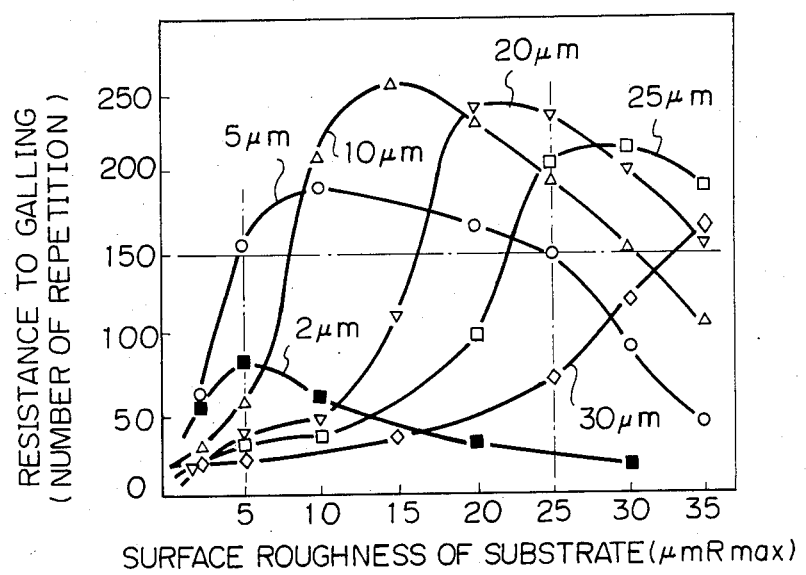

FIG. 13 is a graph similar to FIG. 10, in which the relationship between the surface roughness and the resistance to galling is shown. In the case of FIG. 13, the resin layer was a low molecular weight epoxy resin (m.w. approx. 20,000) containing 70% by weight of MoS$_2$ particles having an average particle diameter of 6 $\mu$m. The same tendency as in FIG. 10 can be seen in FIG. 13.

EXAMPLE 1–5

A series of working examples of the present invention were carried out using an oil well pipe joint of the coupling type shown in FIG. 3(a). The pipe joints were manufactured in a conventional manner. Only the thread-free, outer peripheral surface of the metal sealing portion of the externally-threaded member, i. e., the lip portion 23 of FIG. 3(a) was provided with a galling resistant layer in accordance with the present invention. Not only the surfaces to be treated in accordance with the present invention, but also the inner surfaces of the metal sealing portions of the internally-threaded member were subjected to surface forming with shot blasting or machining.

After the outer surface of the lip portion 23 was coated with a metal layer or a resin layer as in the above, the pipe joints were subjected to a power tight test by which the number of connecting and disconnecting cycles achieved before galling occurred was determined. The power tight test was carried out at a screw revolution speed of 0.5 r.p.m..

The test results are summarized in Tables 1–6.

Table 1 shows Example 1, in which the galling-resistant layer was a metal plating of a soft metal such as copper and tin. Test Run No.4 shows the case in which the thickness of the metal plating was much thinner than that usually required in the present invention.

Table 2 shows Example 2, in which the metal plating layer comprised an uppermost coating of Cr and an undercoating of a soft metal. Comparative Examples 1–3 are the same as those in Example 1.

Table 3 shows Example 3, in which a composite metal plating was carried out.

Table 4 shows Example 4, in which the metal plating comprised a precious metal such as gold and an alloy thereof. In Test Runs Nos. 8 and 9, an undercoating of a soft metal was provided. Test Runs Nos. 4 and 5 show that the provision of such a metal plating on the metal sealing portion of the internally-threaded member is not enough to exhibit improved resistance to galling.

Table 5 shows the resistance to galling before and after corrosion test for the pipe joint of Example 4.

Table 6 shows Example 5, in which a resin coating containing PTFE or MoS$_2$ particles as solid lubricating agents was placed on the lip portion of the externally-threaded member.

As is apparent from the foregoing, according to the present invention an oil well pipe joint can be produced which is free from galling even after more than 10 repeated connecting and disconnecting cycles under severe corrosive conditions.

Although the present invention has been described with respect to preferred embodiments, it is to be understood that variations and modifications may be employed without departing from the concept of the invention as defined in the following claims.

TABLE 1

(Example 1)

| | Externally Threaded Member | | Internally Threaded Member | | | | |
|---|---|---|---|---|---|---|---|
| Test run No. | Surface Forming (Surface Roughness, $\mu$m) | Metal Plating (Thickness, $\mu$m) | Surface Forming (Surface Roughness, $\mu$m) | Metal Plating (Thickness, $\mu$m) | Power Tight Test (No. of Repetitions) | Maximum Connecting Torque (kgf-m) | Remarks |
| 1 | Machining (3)* | — | Machining (3) | — | 1 | — | Comparative Example |
| 2 | Machining (3)* | — | Machining (3) | Cu (2) | 9 | — | |
| 3 | Shot-blasting (10–15) | — | Machining (3) | Zn (5) | 2 | — | |
| 4 | Machining (3) | Cu (0.3)* | Shot-blasting (10–15) | — | 5 | — | |
| 5 | Machining (3) | Cu (2) | Machining (3) | — | 11 | — | Present Invention |
| 6 | Machining (3) | Cu (5) | Machining (3) | — | 16 | — | |
| 7 | Machining (3) | Cu (5) | Shot-blasting (10–15) | — | 20 | 1000 | |
| 8 | Shot-blasting (10–15) | Cu (5) | Machining (3) | — | 19 | — | |
| 9 | Machining (3) | Cu (10) | Machining (3) | — | 18 | — | |

TABLE 1-continued
(Example 1)

| Test run No. | Externally Threaded Member Surface Forming (Surface Roughness, μm) | Metal Plating (Thickness, μm) | Internally Threaded Member Surface Forming (Surface Roughness, μm) | Metal Plating (Thickness, μm) | Power Tight Test (No. of Repetitions) | Maximum Connecting Torque (kgf-m) | Remarks |
|---|---|---|---|---|---|---|---|
| 10 | Shot-blasting (10–15) | Cu (10) | Shot-blasting (10–15) | — | 20 | 1000 | |
| 11 | Machining (3) | Sn (5) | Machining (3) | — | 15 | — | |

Note:
*The bracketed figures indicate surface roughness or thickness in μm.
Alloy type was 25Cr—50Ni alloy. Pipe dimensions were 68.42 mm in outer diameter and 6.45 mm in wall thickness.

TABLE 2
(Example 2)

| Test run No. | Externally Threaded Member Surface Forming (Surface Roughness, μm) | Metal Plating (Thickness, μm) | Internally Threaded Member Surface Forming (Surface Roughness, μm) | Metal Plating (Thickness, μm) | Power Tight Test (No. of Repetitions) | Maximum Connecting Torque (kgf-m) | Remarks |
|---|---|---|---|---|---|---|---|
| 1 | Machining (3) | — | Machining (3) | — | 1 | — | Comparative Example |
| 2 | Machining (3) | — | " | Cu (2) | 9 | — | |
| 3 | Shot-blasting (10–15) | — | " | Zn (5) | 2 | — | |
| 4 | Machining (3) | Cu + Cr (3 + 0.5)* | " | — | 18 | — | Present Invention |
| 5 | Machining (3) | Cu + Cr (10 + 5) | " | — | 20≦ | 2500 | |
| 6 | Machining (3) | Sn + Cr (10 + 1) | " | — | 17 | — | |
| 7 | Machining (3) | Zn + Cr (10 + 1) | " | — | 14 | — | |

Note:
Dimensions of pipes were 139.7 mm in outer diameter, and 7.72 mm in wall thickness.
Alloy type: 25Cr—50Ni alloy
*Cu + Cr (3 + 0.5) means that the undercoating was Cu 3 μm in thickness and the uppermost coating was Cr 0.5 μm in thickness.

TABLE 3
(Example 3)

| Test run No. | Externally Threaded Member Surface Forming (Surface Roughness, μm) | Metal Plating (Thickness, μm) | Internally Threaded Member Surface Forming (Surface Roughness, μm) | Metal Plating (Thickness, μm) | Power Tight Test (No. of Repetitions) | Maximum Connecting Torque (kgf-m) | Remarks |
|---|---|---|---|---|---|---|---|
| 1 | Machining (3) | Cu + PTFE (10)* | Machining (3) | — | 20≦ | 2500 | Present Invention |
| 2 | " | Cu + MoS$_2$ (10) | " | — | 20≦ | 2500 | |
| 3 | " | Sn + PTFE (20) | " | — | 20≦ | 2500 | |
| 4 | " | Zn + PTFE (10) | " | — | 15 | — | |

Note:
Particle size was 2 m for PTFE and MoS$_2$.
*"Cu + PTFE or MoS$_2$ (10)" means that a copper plating 10 μm in thickness contains PTFE or MoS$_2$ particles. These particles were dispersed in a plating solution to effect composite plating.

TABLE 4
(Example 4)

| Test run No. | Externally Threaded Member Surface Forming (Surface Roughness, μm) | Metal Plating (Thickness, μm) | Internally Threaded Member Surface Forming (Surface Roughness, μm) | Metal Plating (Thickness, μm) | Power Tight Test (No. of Repetitions) | Maximum Connecting Torque (kgf-m) | Remarks |
|---|---|---|---|---|---|---|---|
| 1 | Machining (3) | — | Machining (3) | — | 1 | — | Comparative Example |
| 2 | Machining (3) | — | Machining (3) | Cu (2) | 9 | — | |
| 3 | Shot-blasting (10–15) | — | Machining (3) | Zn (5) | 2 | — | |
| 4 | Machining (3) | — | Machining (3) | Au (3) | 13 | — | |
| 5 | Shot-blasting (10–15) | — | Machining (3) | Cu + Au (5 + 1) | 12 | — | |
| 6 | Machining (3) | Au (2) | Machining (3) | — | 16 | — | Present Invention |
| 7 | Machining (3) | Au (5) | Machining (3) | — | 20≦ | 1300 | |
| 8 | Shot-blasting (10–15) | Cu + Au (10 + 2) | Machining (3) | — | 20≦ | 1000 | |
| 9 | Machining (3) | Sn + Au (15 + 5) | Shot-blasting (10–15) | — | 20≦ | 1000 | |
| 10 | Shot-blasting (10–15) | Au (10) | Shot-blasting (10–15) | — | 20≦ | 1000 | |
| 11 | Machining (3) | Au/Ni* (5) | Machining (3) | — | 19 | — | |

Note:
*Au/Ni is an alloy containing 95% of Au.
Pipe dimensions were 68.42 in outer diameter and 6.45 mm in wall thickness.

TABLE 5

| Test run No. | Externally Threaded Member Surface Forming (Surface Roughness, μm) | Externally Threaded Member Metal Plating (Thickness, μm) | No of Connecting-Disconnecting Cycles before Galling Before Corrosion Test | No of Connecting-Disconnecting Cycles before Galling After Corrosion Test | Appearance | Remarks |
| --- | --- | --- | --- | --- | --- | --- |
| 1 | " | Au (2) | 15≦ | 15≦ | Good | Present Invention |
| 2 | " | Au (5) | " | " | " | |
| 3 | " | Sn + Au (10 + 2) | " | " | " | |
| 4 | Shot-blasting (10-15) | Cu + Au (10 + 2) | " | " | " | |
| 5 | Machining (3) | Au/Ni (5) | " | " | " | |

Note:
Alloy type was 25Cr—50Ni alloy. Pipe dimensions were 139.7 mm in outer diameter and 7.72 in wall thickness.
The corrosion test was carried out at 250° C. under an applied stress of 0.9 σy at a pressure of 600 atms for 500 hours using a 20% NaCl solution containing 10 atm $CO_2$ + 0.1 atm $H_2S$.

TABLE 6

(Example 5)

| Test run No. | Externally Threaded Member Alloy Type | Surface Roughness (μm) | Resin Coating Resin Type (Thickness, μm) | Lubricating Particle Content, % (Particle Size, μm) | Power Tight Test (No. of Repetitions) | Remarks |
| --- | --- | --- | --- | --- | --- | --- |
| 1 | High carbon steel | 15 | Cu-plating (10) | — | 9 | Comparative Example |
| 2 | High carbon steel | " | MoS₂ paste (15) | 20 (2) - MoS₂* | 3 | |
| 3 | 13Cr steel | 10 | Resorcinol Epoxy resin (20) | 20 (3) - MoS₂ | 4 | |
| 4 | 13Cr steel | " | Resorcinol Epoxy resin (20) | 20 (1) - PTFE | 5 | |
| 5 | High carbon steel | 15 | Acrylic resin (15) | 50 (5) - MoS₂ | 13 | Present Invention |
| 6 | 9Cr steel | 10 | Resorcinol Epoxy resin (10) | 30 (3) - MoS₂ | 14 | |
| 7 | 9Cr steel | 15 | Phenol resin (10) | 70 (3) - MoS₂ | 17 | |
| 8 | 13Cr steel | " | Urethane oil (10) | 90 (5) - MoS₂ | 18 | |
| 9 | 25Cr—50Ni | 20 | Low M.W. Epoxy resin (15) | 40 (1) - PTFE | 20 | |
| 10 | 25Cr—50Ni | " | Epoxy-phenol resin (15) | 15 (1) - PTFE | 19 | |
| 11 | 9Cr-steel | 10 | Acrylic resin (10) | 25 (1) - PTFE | 18 | |

Note:
Pipe dimensions were 139.7 mm in outer diameter and 7.72 mm in wall thickness.
*"20 (2) - $MoS_2$, - PTFE" means that 20% of $MoS_2$ or PTFE particles each 2 μm in diameter was added.

What is claimed is:

1. An oil well pipe joint having a metal-to-metal sealing portion, which comprises:
   an externally-threaded pipe member including at the outer end a lip portion having a peripheral surface free from threads; and
   an internally-threaded pipe member including at the inner end an inner surface which corresponds to said peripheral surface and which is free from threads;
   characterized in that a galling resistant layer exhibiting improved resistance to galling is provided only on said externally-threaded pipe member and at least on the threadfree lip portion thereof.

2. An oil well pipe joint as defined in claim 1, in which the galling resistant layer is a metal-plated layer.

3. An oil well pipe joint as defined in claim 2, in which the metal-plated layer comprises a metal selected from the group consisting of Cu, Sn, Zn, Pb, and alloys thereof.

4. An oil well pipe joint as defined in claim 2, in which the metal-plated layer comprises a metal matrix layer 0.5-50 μm thick in which solid lubricating particles having a grain size of 0.1-50 μm are dispersed throughout the metal layer matrix, said matrix metal is selected from the group consisting of Zn, Cu, Sn, ,Pb and alloys thereof, and the solid lubricating particles are selected from the group consisting of graphite fluoride, molybdenum disulfide, silicon fluoride, boron nitride, and tetrafluoroethylene.

5. An oil well pipe joint as defined in claim 2, in which the metal-plated layer comprises an uppermost coating of chromium, molybdenum, tungsten, or alloys thereof and an undercoating of a soft metal selected from the group consisting of Cu, Zn, Sn, Pb and alloys thereof, and the total thickness of the layer is 3-50 μm with the thickness of the uppermost coating being at most one-half of the total thickness and the undercoating being 2 μm or thicker.

6. An oil well pipe joint as defined in claim 2, in which the metal-plated layer comprises a metal selected from the group consisting of gold, platinum group metals, and alloys thereof.

7. An oil well pipe joint as defined in claim 1, in which the galling resistant layer is a resin-coated layer.

8. An oil well pipe joint as defined in claim 7, in which the resin-coated layer is provided on a surface with a surface roughness of 5-25 μm Rmax, and comprises a synthetic resin in which fluoroplastic particles 1 μm or less in diameter are dispersed in an amount of 15-40% by weight, and the thickness of the synthetic resin layer is thinner than a maximum of the surface roughness.

9. An oil well pipe joint as defined in claim 8, in which the synthetic resin is selected from the group consisting of silicone resins (molecular weight of about 2,000), low molecular weight epoxy resins (molecular weight of about 20,000), polyether sulfones, epoxyphenol resins (molecular weight of 1,000–3,000), acrylic resins (molecular weight of 2,000–5,000), resorcinol epoxy resins (molecular weight of 20,000–50,000), polyamide resins (Nylon 66), and polyoxybenzoyls.

10. An oil well pipe joint as defined in claim 8, in which in place of said fluoroplastic particles, molybdenum disulfide ($MoS_2$) particles of 10 μm or less in particle diameter are incorporated in an amount of 20–90% by weight.

* * * * *